US012689215B2

(12) United States Patent
Miskovic et al.

(10) Patent No.: US 12,689,215 B2
(45) Date of Patent: Jul. 21, 2026

(54) VOLTAGE CONTROLLER HAVING PHASE-COMPENSATED HARMONIC REGULATOR

(71) Applicant: Caterpillar Inc., Peoria, IL (US)

(72) Inventors: Vlatko Miskovic, Loves Park, IL (US); Seok-hee Han, Dunlap, IL (US); James Thorne, Dunlap, IL (US); Rishi Kant Sharma, Bengaluru (IN)

(73) Assignee: Caterpillar Inc., Peoria, IL (US)

( * ) Notice: Subject to any disclaimer, the term of this patent is extended or adjusted under 35 U.S.C. 154(b) by 181 days.

(21) Appl. No.: 18/784,303

(22) Filed: Jul. 25, 2024

(65) Prior Publication Data

US 2026/0029810 A1    Jan. 29, 2026

(51) Int. Cl.
*H02J 3/01*     (2026.01)
*H02M 7/48*     (2007.01)

(52) U.S. Cl.
CPC ................. *H02J 3/01* (2013.01); *H02M 7/48* (2013.01)

(58) Field of Classification Search
CPC .. H02J 3/01; H02J 3/381; H02M 7/48; H02M 7/44; H02M 1/0003; Y02E 40/40
See application file for complete search history.

(56) References Cited

U.S. PATENT DOCUMENTS 6,940,187 B2    9/2005    Escobar et al.
10,110,111 B2    10/2018    Ohori et al.
(Continued)

FOREIGN PATENT DOCUMENTS

AU    2022207959 A1    2/2023
CN    106602600 A    4/2017
CN    106655185 A  *  5/2017    ................ H02J 3/01
(Continued)

OTHER PUBLICATIONS

Ali Mortezaei et al. "Multifunctional Control Strategy for Asymmetrical Cascaded H-Bridge Inverter in Microgrid Applications", Article, pp. 1538-1551, publication date: Jan. 3, 2017.
(Continued)

*Primary Examiner* — Ryan Johnson
(74) *Attorney, Agent, or Firm* — Perkins Coie

(57)    ABSTRACT

A voltage controller detects a voltage spike in an electrical signal received from an electrical power source. The voltage controller is implemented using a single-loop control system in a stationary reference frame. The electrical signal includes voltage harmonics caused by a non-linear or unbalanced load. The voltage controller includes a phase-compensated harmonic regulator that regulates the voltage harmonics present in the electrical signal and receives a feedback voltage of the single-loop control system. The feedback voltage is a delayed version of an instantaneous voltage of the electrical signal. The instantaneous voltage is sub-transiently stabilized into a steady-state voltage based on the feedback voltage. Sub-transiently stabilizing the instantaneous voltage is performed within a single cycle after the voltage spike is detected. The steady-state voltage has a total harmonic distortion less than a threshold total harmonic distortion and the steady-state voltage has a balanced sinusoidal waveform.

20 Claims, 7 Drawing Sheets

(56) References Cited

U.S. PATENT DOCUMENTS

| | | | | |
|---|---|---|---|---|
| 10,707,774 B1 * | 7/2020 | Harke | ...................... | H02M 7/48 |
| 2022/0077688 A1 | 3/2022 | Patarroyo et al. | | |

FOREIGN PATENT DOCUMENTS

| | | |
|---|---|---|
| CN | 105162134 B | 9/2017 |
| CN | 107968479 A | 4/2018 |
| CN | 106602560 B | 11/2018 |
| CN | 106786639 B | 1/2019 |
| CN | 113964837 A | 1/2022 |
| CN | 113489357 B | 9/2022 |
| CN | 115693733 A | 2/2023 |
| JP | 5964613 B2 | 8/2016 |

OTHER PUBLICATIONS

Written Opinion and International Search Report for Int'l. Patent Appln. No. PCT/US2025/033266, mailed Sep. 26, 2025 (28 pgs).

* cited by examiner

404

$$G(s) = e^{-s \cdot 0.0012}$$

408

$$C(s) = K_h \frac{2(s \cdot \cos\theta_h - \omega_h \cdot \sin\theta_h)}{s^2 + \omega_h^2}$$

412

$$C(s) = K_h \frac{(2\zeta\omega_h)(s \cdot \cos\theta_h - \omega_h \cdot \sin\theta_h)}{s^2 + 2\zeta\omega_h s + \omega_h^2}$$

416

$$K_h = 10, \ \omega_h = 2\pi \cdot 300, \ \zeta = 0.001, \ \theta h = +\pi/3$$

*FIG. 4*

$$504 \sim PCHR_{ID,+h}(s) = K_h \frac{1}{s - j\omega_h} e^{j\Theta_h}$$

$$508 \sim PCHR_{ID,-h}(s) = K_h \frac{1}{s + j\omega_h} e^{-j\Theta_h}$$

$$512 \sim s \rightarrow \frac{\frac{\omega_h T_S}{2}}{\tan\left(\frac{\omega_h T_S}{2}\right)} \cdot \frac{2}{T_S} \cdot \frac{1 - z^{-1}}{1 + z^{-1}}$$

*FIG. 5*

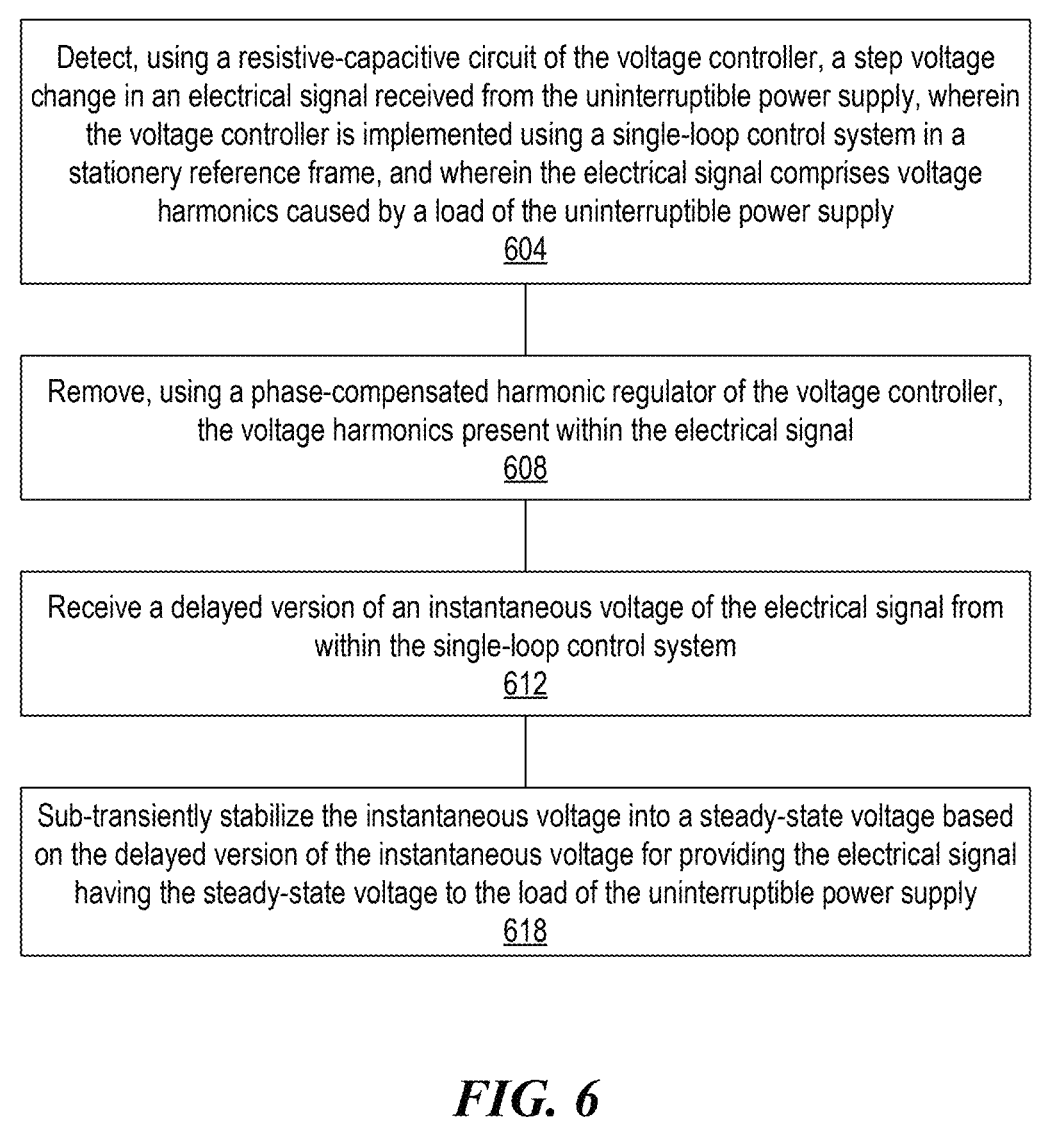

Detect, using a resistive-capacitive circuit of the voltage controller, a step voltage change in an electrical signal received from the uninterruptible power supply, wherein the voltage controller is implemented using a single-loop control system in a stationery reference frame, and wherein the electrical signal comprises voltage harmonics caused by a load of the uninterruptible power supply
604

Remove, using a phase-compensated harmonic regulator of the voltage controller, the voltage harmonics present within the electrical signal
608

Receive a delayed version of an instantaneous voltage of the electrical signal from within the single-loop control system
612

Sub-transiently stabilize the instantaneous voltage into a steady-state voltage based on the delayed version of the instantaneous voltage for providing the electrical signal having the steady-state voltage to the load of the uninterruptible power supply
618

*FIG. 6*

VOLTAGE CONTROLLER HAVING PHASE-COMPENSATED HARMONIC REGULATOR

TECHNICAL FIELD

The present application is related to implementing a voltage controller having a phase-compensated harmonic regulator.

BACKGROUND

Voltage regulation systems or voltage stabilization systems can be designed to maintain a constant voltage using an electromechanical mechanism or electronic components. However, conventional voltage regulators often have a slower voltage transient response when operating in a voltage-controlled mode. A slower voltage response time, for example, in a range from 0.5 seconds to 1 second (depending on the power factor) makes conventional voltage regulators unsuitable for applications such as uninterruptible power supplies for datacenters or microgrid applications that require a faster voltage transient response.

Patent CN105162134B discloses a microgrid system based on phase compensation and selective virtual impedance, however, the patent does not describe sub-transient electrical signal control, which provides a faster voltage transient response than conventional microgrid systems. There is therefore a need for a voltage control solution that provides a faster voltage transient response than traditional voltage controllers.

SUMMARY

This document discloses methods, systems, and apparatuses for implementing a voltage controller using a single-loop control system in a stationary reference frame. In some implementations, a voltage controller (e.g., of a microgrid) includes a circuit (e.g., a resistive-capacitive circuit) configured to detect a voltage spike or a power surge in an electrical signal received from an electrical power source of the microgrid. The voltage spike can be caused by a step change in a load of the microgrid. The electrical signal can further include voltage harmonics caused by a (non-linear or unbalanced) load of the microgrid.

The voltage controller includes a phase-compensated harmonic regulator that receives a feedback voltage from the microgrid and regulates the voltage harmonics present in the electrical signal. The feedback voltage is a delayed version of an instantaneous voltage of the electrical signal. The phase-compensated harmonic regulator sub-transiently stabilizes the instantaneous voltage into a steady-state voltage based on the feedback voltage. Sub-transiently stabilizing the instantaneous voltage is performed within a single cycle after the voltage controller detects the voltage spike. The steady-state voltage has a total harmonic distortion less than a threshold total harmonic distortion. The electrical power source is caused to provide the electrical signal having the steady-state voltage to the microgrid.

In some implementations, operating a voltage controller of an uninterruptible power supply is performed by detecting a voltage spike in an electrical signal received from the uninterruptible power supply. The voltage controller is implemented using a single-loop control system in a stationary reference frame. The electrical signal includes voltage harmonics caused by a load of the uninterruptible power supply. A delayed version of an instantaneous voltage of the electrical signal is received. The voltage harmonics present in the electrical signal are regulated using a phase-compensated harmonic regulator of the voltage controller. The voltage controller sub-transiently stabilizes the instantaneous voltage into a steady-state voltage based on the delayed version of the instantaneous voltage for providing the electrical signal having the steady-state voltage to the load of the uninterruptible power supply.

In some implementations, a computer-controlled grid-forming inverter includes at least one hardware processor and at least one non-transitory computer-readable storage medium storing instructions. The instructions, when executed by the at least one hardware processor, cause the grid-forming inverter to detect a voltage spike or power surge in an electrical signal generated by the grid-forming inverter. The grid-forming inverter is implemented using a single-loop control system in a stationary reference frame. The electrical signal includes voltage harmonics caused by a load of the grid-forming inverter. The grid-forming inverter receives a delayed version of an instantaneous voltage of the electrical signal. The voltage harmonics present in the electrical signal are regulated using a phase-compensated harmonic regulator. The instantaneous power is sub-transiently stabilized into a steady-state power based on the delayed version of the instantaneous voltage.

BRIEF DESCRIPTION OF THE DRAWINGS

FIG. 4 illustrates example mathematical equations used to describe a voltage regulation process, in accordance with some aspects of the present technology.

FIG. 5 illustrates example mathematical equations used to describe the functionality of a single frequency phase-compensated harmonic regulator, in accordance with some aspects of the present technology.

FIG. 6 is a flowchart that illustrates an example process for operating a voltage controller, in accordance with some aspects of the present technology.

DETAILED DESCRIPTION

This document discloses methods, systems, and apparatuses for implementing a voltage controller (sometimes referred to as a "voltage regulator" or a "voltage stabilizer") using a single-loop control system in a stationary reference frame. The voltage controller includes a phase-compensated harmonic regulator configured to filter or cancel voltage harmonics present in an electrical signal or electrical power. The phase-compensated harmonic regulator sub-transiently stabilizes an instantaneous voltage of the electrical signal into a steady-state voltage based on a feedback voltage of the single-loop control system.

Figure 1:
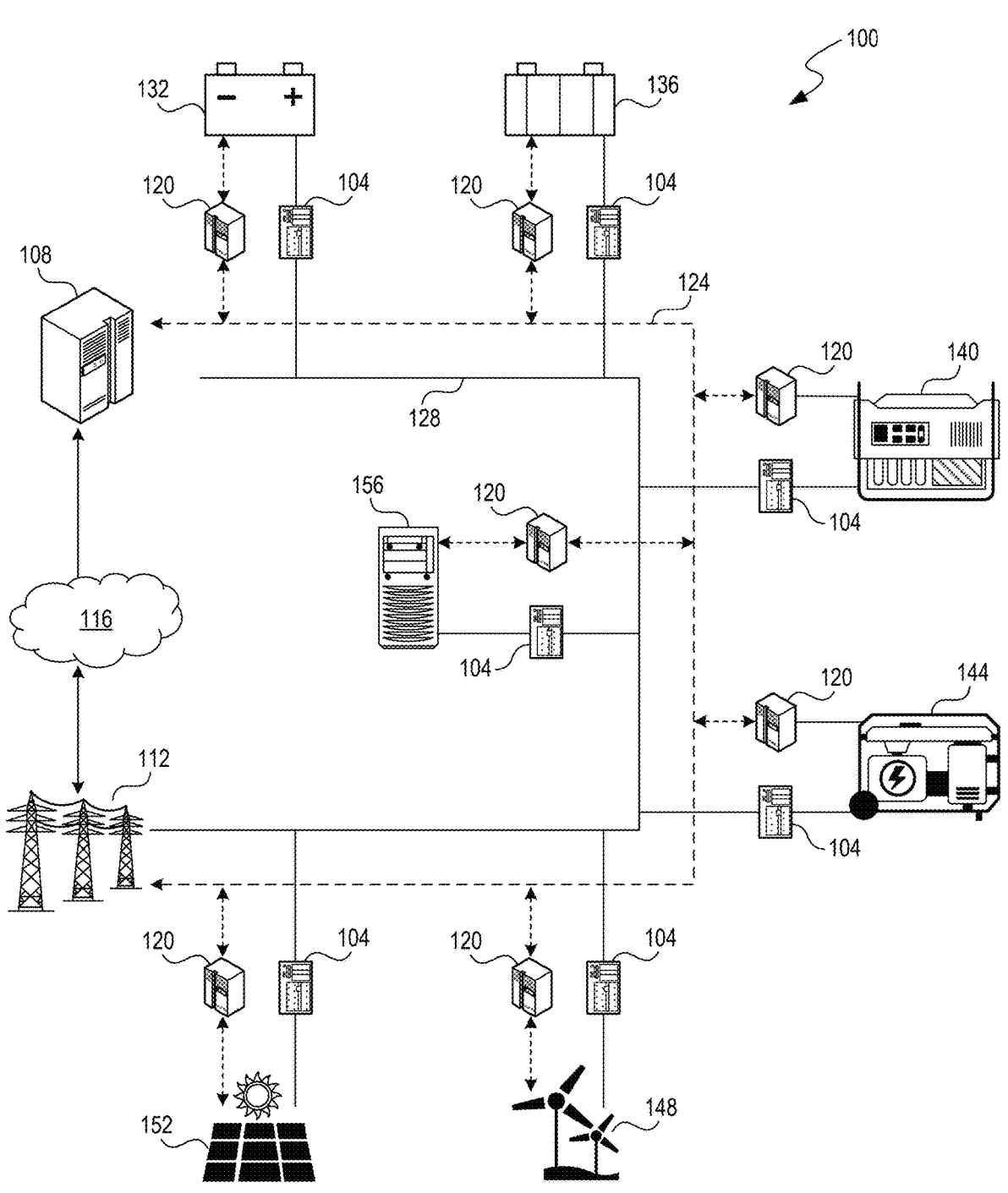
FIG. 1 is a block diagram that illustrates an example microgrid including voltage controllers, in accordance with some aspects of the present technology.

FIG. 1 is a block diagram that illustrates an example microgrid 100 including voltage controllers 104, in accordance with some aspects of the present technology. The microgrid 100 is an electrical network that can generate and store electricity, and can be connected to a utility grid 112 or operate in "island mode" when the utility grid 112 is down. The microgrid 100 can be designed to provide green energy from renewable energy sources, such as solar cells 152, wind turbines 148, as well as fuel cells 136 or an uninterruptible power supply 132. Voltage controllers 104 can be implemented within the microgrid 100 to stabilize the instantaneous voltage on the power line 128 into a steady-state voltage, e.g., when there is a voltage spike.

The microgrid 100 can be connected to the utility grid 112 and can operate synchronously with a traditional wide area synchronous grid (macrogrid), but is able to disconnect from the interconnected grid and to function autonomously in island mode. The microgrid 100 includes distributed energy sources (e.g., solar cells 152) and a load 156 within a local area. The distributed energy sources provide power supply to the microgrid cell, and can supply emergency power, changing between island mode and a "grid connected mode." For example, the microgrid 100 can be used where power transmission and distribution from a major centralized energy source is too far and costly to operate.

The load 156 can be a datacenter, a group of utility customers, or dispersed sites that operate in a coordinated fashion. Multiple loads can be distributed across the microgrid 100. The distributed energy sources can include one or more distributed reciprocating engine generators 144, microturbines 140, fuel cells 136, photovoltaic/solar cells 152, wind turbines 148, and the uninterruptible power supply 132. The distributed energy sources and load 156 are interconnected by the power line 128. As shown by FIG. 1, a voltage controller 104 can be implemented between each distributed energy source and the power line 128 for independently stabilizing the power produced by each distributed energy source. A voltage controller 104 can be connected between the power line 128 and the load 156 for protecting the load 156 from voltage spikes (sometimes referred to as "primary control"). The microgrid 100 can be connected to the utility grid 112 in the grid-connected mode.

The distributed energy sources and the load 156 included in the microgrid 100 are interconnected by a communications and control network 124. The computer server 108 communicates with local controllers 120 over the communications and control network 124 to perform microgrid control functions with respect to each distributed energy source and the load 156. For example, the computer server 108 can receive renewable energy generation and load forecast information, distributed energy source power generation information, and other information used for energy management control operations from the local controllers 120 via the communications and control network 124. The computer server 108 can also communicate power set points and other types of control information generated for energy management control operations to the local controllers 120 via the communications and control network 124. The computer server 108 communicates with the utility grid 112 over the network 116, e.g., when the microgrid 100 switches from the island mode to the grid-connected mode.

Each voltage controller 104 includes digital and/or analog circuitry, such as a controller, a computer processor, an application-specific integrated circuit, etc., for executing program code that performs the voltage stabilization operations described herein. Further, the voltage controllers disclosed herein can provide the setpoints (voltage and current control loops of the distributed energy sources) for downstream controllers (e.g., local controllers 120). Each voltage controller 104 can include one or more storage media, such as dynamic random access memory or a hard disk drive for storing the program code and related data, processed and accessed by the digital and/or analog circuitry during execution of the program code. The storage media stores the results generated by the voltage controller 104. Each voltage controller can also include or be electrically coupled to a fuse, a circuit breaker, a relay, and/or a step-down transformer.

In some implementations, the voltage controllers 104 provide "secondary control," which has typically seconds to minutes sampling time (slower than primary control) that justifies the decoupled dynamics of the primary and the secondary control loops. The voltage controllers 104 can also provide "tertiary control," which is the third (and the slowest) control level. The tertiary control loop considers economical concerns in the optimal operation of the microgrid 100 (sampling time is from minutes to hours), and manages the power flow between microgrid 100 and the utility grid 112. End to end control of the microgrid 100 can also be implemented using machine learning techniques such as deep reinforcement learning. In case of emergencies such as blackouts, tertiary control can manage a group of interconnected microgrids to form what is called "microgrid clustering," acting as a virtual power plant to continue supplying critical loads. During these situations the computer server 108 can select one of the microgrids to be the slack (master) and the rest as power-voltage and load buses according to a predefined algorithm and the existing conditions of the system (demand and generation).

Figure 2:
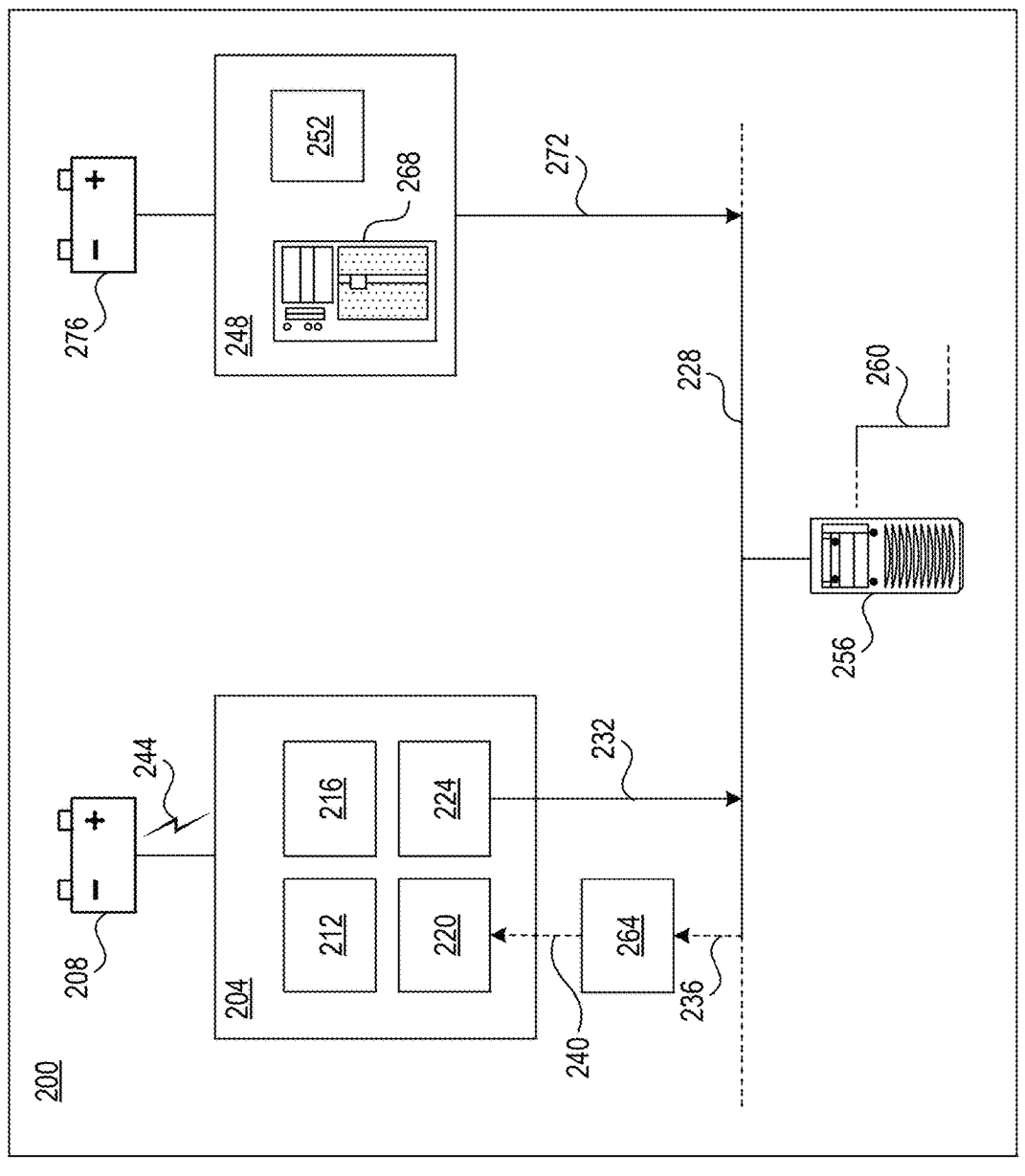
FIG. 2 illustrates an implementation of a voltage controller using a single-loop control system including a phase-compensated harmonic regulator, in accordance with some aspects of the present technology.

FIG. 2 illustrates an implementation of a voltage controller 204 including a phase-compensated harmonic regulator 220 within a microgrid 200, in accordance with some aspects of the present technology. The microgrid 200 is the same as or similar to the microgrid 100 illustrated and described in more detail with reference to FIG. 1. The microgrid 200 includes distributed energy sources 208, 276, the voltage controller 204, a delay circuit 264, a grid-forming inverter 248, a power line 228, and a load 256 (e.g., a datacenter).

The distributed energy sources 208, 276 can each be an uninterruptible power supply or any other distributed energy source illustrated and described in more detail with reference to FIG. 1. The voltage controller 204 includes a resistive-capacitive circuit 212, a pulse-width modulator 216, a phase-compensated harmonic regulator 220, and an electrical circuit 224 (e.g., a relay or a switch). The voltage controller 204 uses the resistive-capacitive circuit 212 to detect a voltage spike 244 in an electrical signal or a power surge in electrical power received from an electrical power source (e.g., distributed energy source 208). The resistive-capacitive circuit (sometimes referred to as an "RC circuit," an "RC filter," or an "RC network") is an electrical circuit composed of resistors and capacitors. The resistive-capacitive circuit 212 is driven by the electrical signal from the distributed energy source 208. The rate of charging of the capacitors of the resistive-capacitive circuit 212 can be measured to detect the voltage spike 244.

The voltage spike 244 can be caused by a step change 260 in the load 256 of the microgrid 200. For example, when the impedance of the load 256 decreases rapidly over a short period of time (referred to as a "step change"), the voltage on the power line 228 can increase rapidly (referred to as a "voltage spike"). Similarly, a power surge can result from a sudden increase of voltage sent through the microgrid 200. Power surges can range from as little as one volt over the threshold maximum of 169 volts to thousands of excess volts, such as when lightning strikes power lines or a transformer. The load 256 can be a non-linear or an unbalanced load that causes voltage harmonics on the power line 228.

The voltage controller 204 is implemented using a single-loop control system model, which includes the phase-compensated harmonic regulator 220. Harmonic regulators are narrow frequency-band regulators that are designed to regulate specific frequencies. For example, the voltage controller 204 can be implemented as a feedback-controlled dynamic system, having a system loop gain L(s), a compensator transfer function C(s), and a plant transfer function G(s). When the compensator transfer function of the phase-compensated harmonic regulator 204 is C(s), and the plant transfer function G(s) equals 1, then the single-loop control system model is stable. The single-loop control system model operates in a stationary reference frame. Stationary reference frame control, also referred to as αβ-control, regulates control signals in a stationary two-phase frame.

The single-loop control system model used to implement the voltage controller 204 can include a control component (e.g., the phase-compensated harmonic regulator 220 whose functionality is described by the compensator transfer function C(s)), a plant component (whose functionality is described by the plant transfer function G(s)), and disturbances. The phase-compensated harmonic regulator 220 regulates a fundamental (main) frequency component (e.g., 60 Hz for the U.S. grid). The plant component is used to model the system being controlled (e.g., the power line 228 and the load 256). For example, the plant component in the model is configured to provide the feedback voltage 240 to the phase-compensated harmonic regulator 220. The disturbances cause voltage and/or current harmonics due to non-linear loads. While harmonic regulators can regulate unwanted harmonics, traditional control systems can become unstable around a particular harmonic frequency due to shifts in phase. The implementations described herein therefore use the phase-compensated harmonic regulator 220 to provide an additional degree of freedom that provides stability to the single-loop control system model and/or enhances the stability margins.

To stabilize the voltage on the power line 228 according to the single-loop control system model, the phase-compensated harmonic regulator 220 receives a feedback voltage 240 via a feedback loop as shown by FIG. 1. The feedback voltage 240 can be a delayed version of an instantaneous voltage 236 of the power line 228. The delay is provided by the delay element 264, e.g., a time-delay relay. The phase-compensated harmonic regulator 220 sub-transiently stabilizes the instantaneous voltage 236 on the power line 228 into a steady-state voltage 232 based on the feedback voltage 240. After the voltage spike 244 occurs, the instantaneous voltage 236 is typically very high and begins reducing slowly. The sub-transient period typically lasts for two cycles after the voltage spike 244. Because the voltage controller 204 is implemented using a single-loop control system model, the phase-compensated harmonic regulator 220 can sub-transiently stabilize the instantaneous voltage 236 within a single cycle after the resistive-capacitive circuit 212 detects the voltage spike 244.

The voltage controller 204 can regulate the magnitude and/or phase of the instantaneous voltage 236. While a conventional harmonic regulator may be unable to regulate the phase of an electrical signal at the peak of the regulated frequency, the phase-compensated harmonic regulator 220 disclosed herein has additional degrees of freedom that can be used to regulate (or "compensate") the phase of the electrical signal provided by the distributed energy source 208. The phase compensation capabilities of the phase-compensated harmonic regulator 220 are particularly useful to stabilize the single-loop control system model.

The phase-compensated harmonic regulator 220 can be configured to perform current-mode control of the instantaneous voltage 236. Current-mode control can regulate the voltage of power line 228 based on the current response. Therefore, current-mode control can respond faster to changes in load impedance (e.g., the step change 260 in the load 256). This is because current-mode control inherently provides a more accurate measurement of the actual power delivered to the load 256. Current-mode control can also be used to prevent sub-harmonic oscillations that can occur in voltage mode control when the converter is operating in continuous conduction mode. Sub-harmonic oscillations can cause the output voltage to fluctuate at a frequency that is lower than the converter's switching frequency. Current-mode control can regulate sub-harmonic oscillations because parasitics in the output filter are not altering the measured switching current. With fewer parasitics on the measurement path, the switching current can be measured more accurately.

After the voltage is stabilized, the voltage controller 204 causes the electrical power source (e.g., distributed energy source 208) to provide an electrical signal having the steady-state voltage 232 to the power line 228 and the load 256 of the microgrid 200. The steady-state voltage 232 can have a balanced sinusoidal waveform. The load 256 visible to the distributed energy source 208 can be a non-linear load whose impedance changes with the applied voltage. Due to the changing impedance, the current drawn by the non-linear load 256 will not be sinusoidal even when it is connected to a sinusoidal voltage. The non-sinusoidal currents contain harmonic currents that interact with the impedance of the microgrid 200 to create voltage distortion that can affect both the microgrid equipment and the load 256 connected to it. However, the voltage controller 204 including the phase-compensated harmonic regulator 220 described herein provides a steady-state voltage 232 having a balanced sinusoidal waveform to the non-linear load 256.

The voltage controller 204 can trigger the electrical circuit 224 (e.g., a relay or a switch) to cause distributed energy source 208 to provide an electrical signal having the steady-state voltage 232. The electrical circuit 224 can be an electrically operated switch including a set of input terminals for a single or multiple control signals, and a set of operating contact terminals. The switch may have any number of contacts in multiple contact forms, such as make contacts, break contacts, or combinations thereof. The voltage controller 204 can thus control the electrical power provided to the routers, switches, firewalls, storage systems, servers, and application delivery controllers of a datacenter (e.g., load 256). Other loads for which the voltage controllers disclosed herein can regulate power include the network infrastructure (connecting servers—physical and virtualized, data center services, storage, and external connectivity to end-user locations), storage infrastructure (used to hold data), and computing resources (servers providing the processing, memory, local storage, and network connectivity that drive applications).

The phase-compensated harmonic regulator 220 can be implemented using software programmed and stored on a computer-readable medium and executed on one or more computer processors. For example, the control software of the phase-compensated harmonic regulator 220 processes monitored variables, such as voltage or current that physically exist as analog signals. The analog signals are interpreted as digital values with various ranges of accuracy depending on the device and the number of bits available to store the data. For example, an analog 0 to 10 V or 4-20 mA current loop input would be converted into an integer value of 0 to 32,767. Conversion software can take this value and transpose it into the desired units of the process so the phase-compensated harmonic regulator program can read it. Proper integration also includes filter times to reduce noise as well as high and low limits to report faults.

In some implementations, a custom printed circuit board like a microcontroller is used to implement the phase-compensated harmonic regulator 220, executing code in a language that is easy to use, modify and maintain. More complex control systems can be implemented using single-board computers that use semi-customized or fully proprietary hardware. For example, desktop-type computers can interface with industrial I/O hardware while executing programs within a version of commercial operating systems adapted for process control needs. Regardless of the specific implementation, the embodiments disclosed herein provide precise voltage control, robust transient response, and generator protection. Specifically, the methods disclosed herein can be used to provide automatic voltage regulation, power factor regulation, reactive power regulation, programmable stability settings, soft start control with an adjustable time setting, dual slope underfrequency (Volts/Hertz) regulation, three-phase or single-phase generator voltage (RMS) sensing/regulation, single-phase generator current sensing for regulation purposes, field current and field voltage sensing, five contact sensing inputs for system interface, visual indication of alarm and shutdown fault conditions, fault shutdown driver and alarm output driver for indication of alarm and shutdown fault conditions, generator paralleling with reactive droop compensation and reactive differential compensation, and/or line drop compensation.

The pulse-width modulator 216 is configured to control an amount of electrical power delivered to the load 256. Pulse-width modulation, also known as pulse-duration modulation or pulse-length modulation, is used to represent an electrical signal as a rectangular wave with a varying duty cycle. Pulse-width modulation is useful for controlling the average power or amplitude delivered by an electrical signal. For example, the pulse-width modulator 216 can be controlled using an algorithm known as space vector modulation.

The grid-forming inverter 248 is connected between the distributed energy source 276 and the power line 228. Similarly, a grid-forming inverter can be implemented between any of the distributed energy sources (e.g., solar cells 152) shown by FIG. 1 and the power line 128 to allow the distributed energy sources to provide energy to the microgrid 100. The grid-forming inverter 248 includes a voltage controller 268 and an inductive-capacitive filter 252. The voltage controller 268 has the same or similar components and functionality as the voltage controller 204.

The grid-forming inverter 248 includes hardware to convert direct current (DC) power (e.g., from the distributed energy source 276) to alternating current (AC) power. The conversion can be controlled by a component known as an "H-bridge." An H-bridge is an electronic circuit that changes the polarity of a voltage applied to a load (e.g., load 256). For example, DC current flows from the distributed energy source 276 to the H-Bridge. Controlled by transistors, the H-Bridge affects the DC power, causing it to alternate and hence creates the effects of AC. This can happen several hundreds or thousands of times per second. For example, the frequency may reach up to 70 kHz (70,000 times per second), to mimic AC power as closely as possible.

The grid-forming inverter 248 can inject voltage into microgrid 200 using the distributed energy source 276 and then adjust its frequency according to the amount of electrical power flowing through the microgrid 200. For example, the grid-forming inverter 248 can adjust its output power and voltage in response to grid conditions and coordinate with other energy sources (e.g., distributed energy source 208) to balance supply and demand. The grid-forming inverter 248 can detect, using a resistive-capacitive circuit (similar to the resistive-capacitive circuit 212), a voltage spike (similar to voltage spike 244) in an electrical signal or a power surge in electrical power generated by an electrical power source (e.g., distributed energy source 276).

The voltage controllers 204, 248 are implemented in a primary control loop that sub-transiently stabilizes voltage and frequencies of the electrical signal on the power line 228. In addition, the voltage controllers 204, 248 can offer plug and play capability for electrical power sources and share the active and reactive power among them. In some implementations, the voltage controllers 204, 248 mitigate circulating currents to avoid over-current phenomenon in power electronic devices.

The inductive-capacitive filter 252 is used to filter specific frequencies 272 of a steady-state voltage produced by the grid-forming inverter 248. The inductive-capacitive filter 252 includes inductors and capacitors to form low-pass, high-pass, multiplexer, band-pass, or band-reject filtering. The inductive-capacitive filter 252 can provide active damping in the grid-forming inverter 248 to modify a closed-loop transfer function to regulate the resonance phenomenon. In addition, feedback control techniques can be used for the alteration of the transfer function, relying on either the inverter current, the capacitor voltage, or the grid current.

Figure 3:
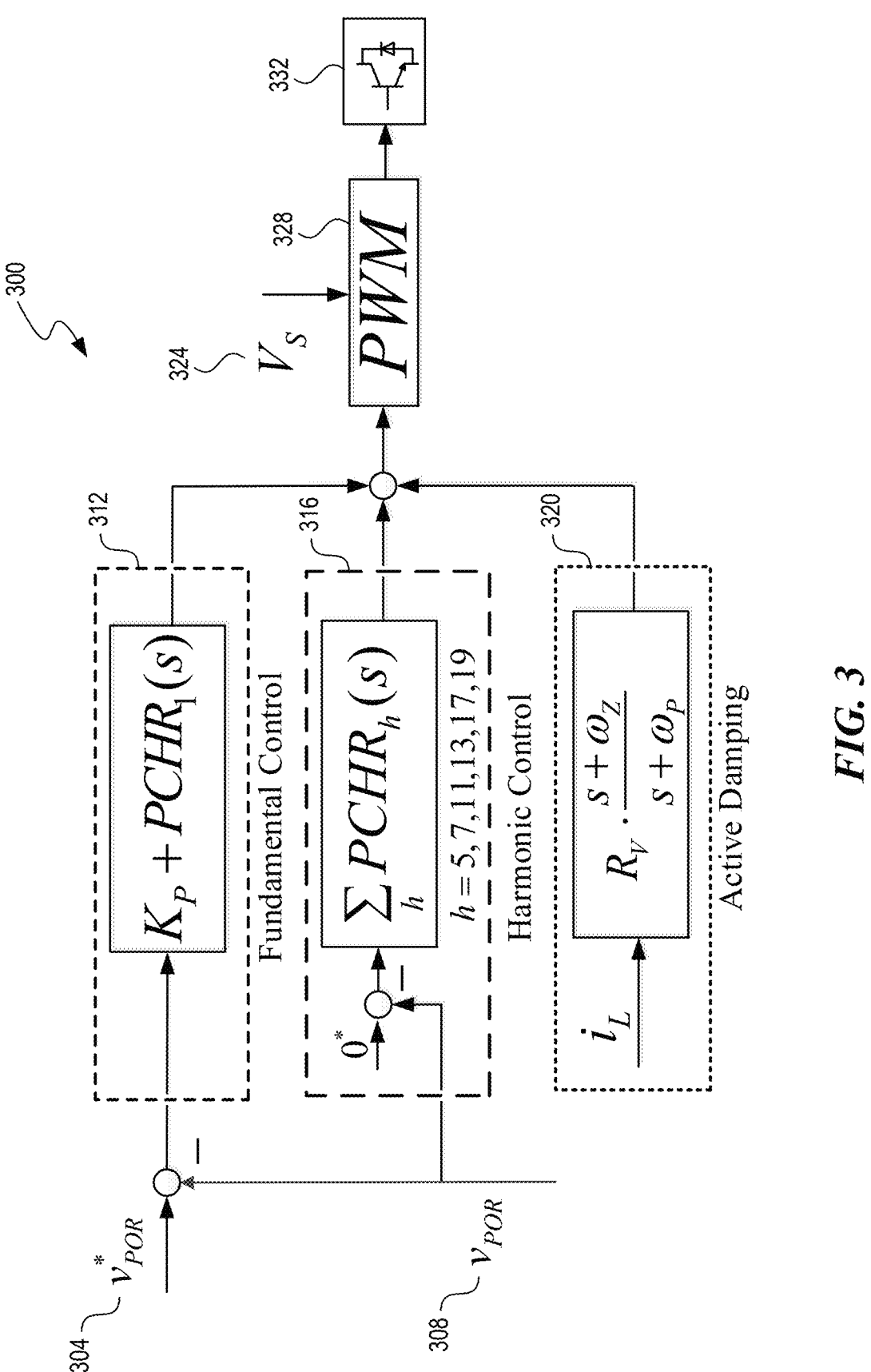
FIG. 3 is a drawing that illustrates an example phase-compensation method for a grid-forming inverter, in accordance with some aspects of the present technology.

FIG. 3 is a drawing that illustrates an example phase-compensation method for a grid-forming inverter 300, in accordance with some aspects of the present technology. For example, the phase-compensation method shown by FIG. 3 can be used for the grid-forming inverter 248, illustrated and described with reference to FIG. 2. FIG. 3 includes a fundamental control module 312, a harmonic control module 316, an active damping module 320, a pulse-width modulator 328, and an inverter circuit 332.

The grid-forming inverter 300 is the same as or similar to the grid-forming inverter 248 shown by FIG. 2. The signal 304 (v*$_{POR}$) shown by FIG. 3 denotes the voltage reference (set point) at the point of regulation (POR) of the grid-forming inverter 300. The signal 308 (v$_{POR}$) denotes the actual voltage at the point of regulation. The fundamental control module 312 provides a proportional gain (K$_P$) and performs phase-compensated harmonic regulation at a fundamental harmonic (i.e., 60 Hz when h=1). The harmonic control module 316 aggregates the phase-compensated harmonic regulators that regulate unwanted harmonics to zero (0), i.e., when the reference signal 304 (v*$_{POR}$) is 0*. Typical values of the harmonics are listed in FIG. 3, beginning with h=5 (for 60 Hz×5=300 Hz, for the 5th harmonic).

The grid-forming inverter 300 can regulate the voltage harmonics present in an electrical signal—signal 308 (v$_{POR}$). For example, the electrical signal includes voltage harmonics caused by a load (e.g., the load 256 of the microgrid 200 shown by FIG. 2). The grid-forming inverter 300 can also be configured to regulate current harmonics present in the electrical signal. In an electrical power system such as the microgrid 200 shown by FIG. 2, a harmonic of a voltage or current waveform is a sinusoidal wave whose frequency is an integer multiple of the fundamental frequency. Harmonic frequencies are produced by the action of non-linear loads such as rectifiers, discharge lighting, or saturated electric machines.

The grid-forming inverter 300 regulates the voltage or current harmonics (e.g., caused by nonlinear loads and/or other disturbances) by injecting "the opposite" harmonics using the inverter circuit 332 (e.g., implemented in a hardware power circuit) and a power supply (e.g., $V_S$ signal 324) to provide a reference electrical signal 304 ($v^*_{POR}$). The reference electrical signal can also be an electrical current. The grid-forming inverter 300 can amplify particular harmonics, attenuate particular harmonics, or cancel particular harmonics depending on the particular reference electrical signal, e.g., signal 304 ($v^*_{POR}$), that is provided by the inverter circuit 332 and the power supply. For example, the reference electrical signal is set to 0 to cancel particular unwanted harmonics.

Further, the grid-forming inverter 300 can sub-transiently stabilize an instantaneous voltage (e.g., resulting from a voltage spike or a power surge in electrical power) into a steady-state voltage based on a feedback voltage of a single-loop control system, as illustrated and described in more detail with reference to FIG. 2. The resulting steady-state voltage (e.g., the steady-state voltage 232 shown by FIG. 2) produced by the grid-forming inverter 300 has a total harmonic distortion less than a threshold total harmonic distortion. The total harmonic distortion is used to describe the state of the harmonics in the system or the sum of all the harmonic effects. For example, the total harmonic distortion can be defined as the ratio of the sum of the powers of all harmonic components to the power of the fundamental frequency. In power systems, a lower total harmonic distortion implies lower peak currents, less heating, lower electromagnetic emissions, and less core loss in motors. The total harmonic distortion can be measured up to the 50th multiple of the fundamental frequency of the power system (e.g., 60 Hz), at 3 kHz, or according to some implementations, the 40th multiple (e.g., 2.4 kHz). In some implementations, the threshold total harmonic distortion of the regulated voltage ($THD_V$) is about 2%. For example, the threshold total harmonic distortion can lie in a range from 1.5% to 2.1%.

The active damping module 320 implements a control algorithm to dampen any potential resonances. The active damping module 320 is implemented as a hardware filter, e.g., an inductive-capacitive filter (such as the inductive-capacitive filter 252 shown by FIG. 2) or an inductive-capacitive-inductive filter. An inductive-capacitive-inductive filter (sometimes referred to as a "line filter") is designed to suppress the switching frequency components caused by, e.g., a rectifier's semiconductors. An inductive-capacitive-inductive filter includes a parallel-series combination of reactors and capacitors adapted to reduce the total harmonic distortion of rectifiers.

The pulse-width modulator 328 is similar to or same as the pulse-width modulator 216 shown by FIG. 2. The $V_S$ signal 324 input to the pulse-width modulator 328 is generated by a power supply, e.g., a DC voltage source from which energy is transferred to a load (e.g., the load 256 shown by FIG. 2). The power supply can be implemented by a battery, a large capacitor, or any of the distributed energy sources (e.g., solar cells 152) shown by FIG. 1. The pulse-width modulator 328 translates the $V_S$ signal 324 into a gating signal (pulses) for transistors that are part of the inverter circuit 332. The inverter circuit 332 converts the DC signal from the pulse-width modulator 328 to an AC signal.

The phase-compensation method for the grid-forming inverter 300 shown by FIG. 3 improves the power quality provided by the electrical power source that generates the $V_S$ signal 324 to a load. For example, the grid-forming inverter 300 can regulate the voltage, phase, and/or current produced by an electrical power source to prevent dips and swells (voltage lower or higher than expected), harmonics (frequency effects caused either by the power supply or by equipment operating within the system), unbalance (the effect of voltage or current variations on each of the electrical phases), and/or flicker (effects caused by repetitive switching of electrical loads such as arc furnaces or other processes).

FIG. 4 illustrates example mathematical equations used to describe a voltage regulation process, in accordance with some aspects of the present technology. The voltage regulation process is performed by a voltage controller that includes a phase-compensated harmonic regulator in accordance with a single-loop control system model. For example, the voltage controller and the phase-compensated harmonic regulator can be the voltage controller 204 and the phase-compensated harmonic regulator 220 shown by FIG. 2, respectively. As described in more detail with reference to FIG. 2, the single-loop control system model includes a control component (e.g., the phase-compensated harmonic regulator 220) and a plant component. The mathematical equation 404 can be used to describe the functionality of the plant component for the voltage regulation process.

The mathematical equation 408 can be used to describe the functionality of an ideal phase-compensated harmonic regulator as a frequency-domain (Laplace-domain) expression. A harmonic regulator for an AC power system (e.g., the microgrid 200 shown by FIG. 2) can include a regulator module configured to filter or cancel one or more harmonic frequencies of a fundamental frequency. The regulator module can inflect the phase angle output about the one or more harmonic frequencies. The regulator module can be configured to shift the phase at or near one or more harmonic frequencies by a shift angle to prevent the system instability. For example, the shift angle can be 45 degrees. The shift angle can be positive 45 degrees or negative 45 degrees. In certain embodiments, the shift angle can be selected from a positive or negative shift angle based on the conditions needed to ensure stability. Any suitable shift angle and/or combinations thereof to prevent control instability is contemplated herein, and one having ordinary skill in the art in view of this disclosure can determine any other suitable angle without undue experimentation.

In certain implementations, the output of the harmonic module can be non-ideal. For example, the mathematical equation 412 can be used to describe the functionality of a non-ideal phase-compensated harmonic regulator as a frequency-domain (Laplace-domain) expression. The parameters of the single-loop control system model can include the parameters listed in the mathematical equation 416. The example parameters in the mathematical equation 416 include $K_h$ (which denotes the gain of the phase-compensated harmonic regulator), $\omega_h$ (which denotes the frequency being regulated), $\zeta$ (which denotes the damping coefficient—the damping coefficient applies only to the non-ideal phase-compensated harmonic regulator described by the mathematical expression 412, and not to the ideal phase-compensated harmonic regulator described by the mathematical expression 408), and h (which denotes the phase shift at the frequency $\omega_h$—the phase shift is zero (0) for conventional harmonic regulators and cannot be regulated).

FIG. 5 illustrates example mathematical equations 504, 508, 512 used to describe the functionality of a single frequency phase-compensated harmonic regulator, in accordance with some aspects of the present technology. While the phase-compensation method for the grid-forming inverter 300 depicted by FIG. 3 is used to regulate both positive and negative sequences of voltage harmonics, the mathematical equations 504, 508 shown by FIG. 5 describe the functionality of a phase-compensated harmonic regulator that regulates only one of a positive frequency component or a negative frequency component of the voltage harmonics. The mathematical equation 504 describes the functionality of a phase-compensated harmonic regulator that regulates only the positive frequency component of the voltage harmonics. The mathematical equation 508 describes the functionality of a phase-compensated harmonic regulator that regulates only the negative frequency component of the voltage harmonics.

The mathematical equation 512 is used to describes the discrete functionality of a single-frequency phase-compensated harmonic regulator using the bilinear transform with pre-warping. The bilinear transform (also known as Tustin's method) with pre-warping can transform continuous-time system representations to discrete-time representations and vice versa. For example, the bilinear transform is used in digital signal processing and discrete-time control theory. As shown by mathematical equation 512, the Tustin-with-pre-warping discrete transfer function has a resonant peak at $\omega_h$ (the same as the continuous function) and the phase is the same as in the case of the continuous transfer function.

FIG. 6 is a flowchart that illustrates an example process for operating a voltage controller that includes a phase-compensated harmonic regulator, in accordance with some aspects of the present technology. In some implementations, the process is performed by the voltage controller 204 illustrated and described in more detail with reference to FIG. 2. Particular entities, for example, the phase-compensated harmonic regulator 220 (shown by FIG. 2) or the grid-forming inverter 300 (shown by FIG. 3) perform some or all of the steps of the process in other implementations. Likewise, implementations can include different and/or additional steps or can perform the steps in different orders.

In act 604, a voltage controller uses a resistive-capacitive circuit to detect a voltage spike in an electrical signal or a power surge in electrical power received from an electrical power source, e.g., an uninterruptible power supply. For example, the resistive-capacitive circuit, the voltage spike, and the electrical power source can be the resistive-capacitive circuit 212, the voltage spike 244, and the distributed energy source 208 shown by FIG. 2, respectively. The voltage spike can be caused by a step change in the load of the electrical power source, e.g., due to blackouts, short circuits, capacitor start up, electrical storms, and/or high demand of energy usage in peak seasons. For example, the load and the step change can be the load 256 and the step change 260 shown by FIG. 2, respectively.

In act 608, the voltage controller uses a phase-compensated harmonic regulator to regulate voltage harmonics present in the electrical signal. In an electrical power system (e.g., microgrid 200 shown by FIG. 2), a harmonic of a voltage or a current waveform is a sinusoidal wave whose frequency is an integer multiple of the fundamental frequency. Harmonic frequencies are produced by the action of non-linear loads such as rectifiers, discharge lighting, or saturated electric machines. Harmonic currents can be shunted by or blocked by harmonic filters, which are series or parallel resonant circuits. For example, harmonic filters can reduce the harmonic currents flowing in the electrical power system from the electrical power source and thereby reduce the harmonic voltage distortion in the system. The phase-compensated harmonic regulator can be implemented as a harmonic regulator having a phase-compensation component to regulate the voltage harmonics.

In act 612, the phase-compensated harmonic regulator receives a delayed version of an instantaneous voltage of the electrical signal based on a single-loop control system model. For example, the instantaneous voltage and the delayed version can be the instantaneous voltage 236 and the feedback voltage 240 shown by FIG. 2, respectively.

In act 618, the phase-compensated harmonic regulator sub-transiently stabilizes the instantaneous voltage into a steady-state voltage. For example, the steady-state voltage can be the steady-state voltage 232 shown by FIG. 2. The instantaneous voltage is stabilized into the steady-state voltage based on the delayed version of the instantaneous voltage. The stabilization is performed for providing the electrical signal having the steady-state voltage to the load of the electrical power source. The voltage controller sub-transiently stabilizes the instantaneous voltage within a single cycle after the voltage controller detects the voltage spike. For example, the voltage controller can cause an uninterruptible power supply to provide an electrical signal having a steady-state voltage to power a datacenter.

INDUSTRIAL APPLICABILITY

The disclosed apparatuses and systems can be implemented in an electrical microgrid to maintain stable system operation, regulate voltages, and equalize load sharing among distributed generators under steady-state conditions. For example, the disclosed apparatuses can be used to provide local control for energy management in a hybrid microgrid. The disclosed systems can also be implemented within automatic voltage controllers for interactive uninterruptible power supply systems to stabilize the incoming AC signal and maintain output power at the specified nominal voltage by controlling high and low voltages without resorting to battery power.

The benefits and advantages of the implementations described herein include rapid sub-transient voltage stabilization in the presence of a step change in a load, for example, in microgrid and uninterruptible power supply applications. The apparatuses disclosed perform phase modulation and achieve superior total harmonic distortion and superior power quality compared to conventional methods. The disclosed methods provide the required power quality at sub-transient speed because of the single-loop control system architecture. Further, the phase-compensated harmonic regulator described herein regulates the voltage harmonics present in the electrical signal.

Moreover, the apparatuses described herein provide accurate output voltage regulation with a wide variety of kVA ratings, voltages and configurations. The disclosed methods are applicable to outdoor applications and have a higher tolerance to system faults and overload compared to traditional methods. The described systems provide a higher tolerance to power factor and frequency deviations than conventional systems. The disclosed voltage controllers provide superior line isolation and are relatively inexpensive compared to traditional voltage regulators.

Figure 7:
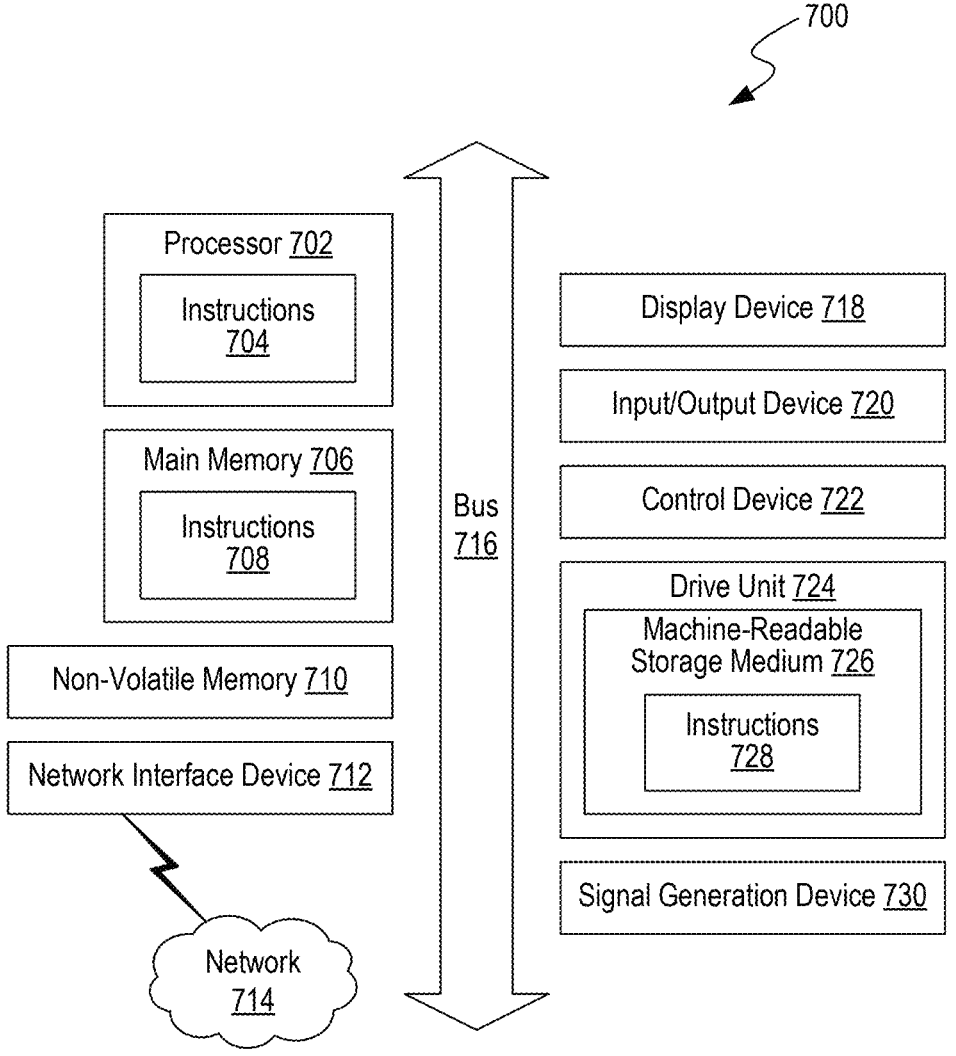
FIG. 7 is a block diagram that illustrates an example of a computer system in which at least some operations described herein can be implemented.

FIG. 7 is a block diagram that illustrates an example of a computer system 700 in which at least some operations described herein can be implemented. Components of the computer system 700 can be used to implement the voltage controller 204 and grid-forming inverter 248 shown by FIG. 2.

As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 720 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or include a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically include one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

We claim:

1. A voltage controller of a microgrid, the voltage controller comprising:
   a first circuit configured to
      detect a voltage spike in an electrical signal received from an electrical power source of the microgrid,
         wherein the voltage spike is caused by a step change in a load of the microgrid,
         wherein the voltage controller is implemented using a single-loop control system in a stationary reference frame, and
         wherein the electrical signal comprises harmonics caused by the load of the microgrid; and
   a phase-compensated harmonic regulator configured to:
      receive a feedback voltage of the single-loop control system,
         wherein the feedback voltage is a delayed version of an instantaneous voltage of the electrical signal;
      regulate the harmonics present in the electrical signal; and
      sub-transiently stabilize the instantaneous voltage into a steady-state voltage based on the feedback voltage within a single cycle after the circuit detects the voltage spike,
         wherein the steady-state voltage has a total harmonic distortion less than a threshold total harmonic distortion, and
         wherein the steady-state voltage has a balanced sinusoidal waveform; and
   a second circuit configured to cause the electrical power source to provide the electrical signal having the steady-state voltage to the microgrid.

2. The voltage controller of claim 1, wherein the single-loop control system comprises a control component and a plant component,
   wherein the control component comprises the phase-compensated harmonic regulator, and
   wherein the plant component is configured to provide the feedback voltage to the phase-compensated harmonic regulator.

3. The voltage controller of claim 1, wherein the phase-compensated harmonic regulator is configured to regulate only one of a positive frequency component or a negative frequency component of the voltage harmonics.

4. The voltage controller of claim 1, wherein the voltage controller comprises:
   a pulse-width modulator configured to:
      control an amount of electrical power delivered to the microgrid.

5. The voltage controller of claim 1, wherein the threshold total harmonic distortion is about 2%.

6. The voltage controller of claim 1, wherein the voltage controller is configured to regulate at least one of a magnitude or a phase of the instantaneous voltage.

7. The voltage controller of claim 1, wherein the phase-compensated harmonic regulator is configured to:

perform current-mode control of the instantaneous voltage of the electrical signal.

8. A computer-implemented method of operating a voltage controller of an uninterruptible power supply, the method comprising:

detecting, using a resistive-capacitive circuit of the voltage controller, a voltage spike in an electrical signal received from the uninterruptible power supply, wherein the voltage controller is implemented using a single-loop control system in a stationary reference frame, and wherein the electrical signal comprises voltage harmonics caused by a load of the uninterruptible power supply;

receiving a delayed version of an instantaneous voltage of the electrical signal in accordance with the single-loop control system;

regulating, using a phase-compensated harmonic regulator of the voltage controller, the voltage harmonics present in the electrical signal; and sub-transiently stabilizing the instantaneous voltage into a steady-state voltage based on the delayed version of the instantaneous voltage for providing the electrical signal having the steady-state voltage to the load of the uninterruptible power supply.

9. The computer-implemented method of claim 8, wherein the voltage spike is caused by a step change in the load of the uninterruptible power supply, and wherein the load of the uninterruptible power supply is a non-linear or unbalanced load.

10. The computer-implemented method of claim 8, comprising:

causing the uninterruptible power supply to provide the electrical signal having the steady-state voltage to a datacenter.

11. The computer-implemented method of claim 8, wherein the steady-state voltage has a total harmonic distortion less than a threshold total harmonic distortion.

12. The computer-implemented method of claim 8, wherein the steady-state voltage has a balanced sinusoidal waveform.

13. The computer-implemented method of claim 8, wherein sub-transiently stabilizing the instantaneous voltage is performed within a single cycle after the voltage controller detects the voltage spike.

14. The computer-implemented method of claim 8, wherein the phase-compensated harmonic regulator regulates only one of a positive frequency component or a negative frequency component of the voltage harmonics.

15. A grid-forming inverter comprising:

at least one hardware processor; and at least one non-transitory computer-readable storage medium storing instructions, which, when executed by the at least one hardware processor, cause the grid-forming inverter to:

detect, using a resistive-capacitive circuit, a power surge in electrical power generated by the grid-forming inverter, wherein the grid-forming inverter is implemented using a single-loop control system in a stationary reference frame, and wherein the electrical power comprises voltage harmonics caused by a load of the grid-forming inverter;

receive a delayed version of an instantaneous voltage of the electrical power in accordance with the single-loop control system;

regulate, using a phase-compensated harmonic regulator, the voltage harmonics present in the electrical power; and sub-transiently stabilize the instantaneous voltage into a steady-state voltage based on the delayed version of the instantaneous voltage.

16. The grid-forming inverter of claim 15, wherein the instructions cause the grid-forming inverter to filter, using an inductive-capacitive filter, specific frequencies of the steady-state voltage.

17. The grid-forming inverter of claim 15, wherein the steady-state voltage has a total harmonic distortion less than a threshold total harmonic distortion.

18. The grid-forming inverter of claim 15, wherein the steady-state voltage has a balanced sinusoidal waveform.

19. The grid-forming inverter of claim 15, wherein sub-transiently stabilizing the instantaneous voltage is performed within a single cycle after detecting the power surge.

20. The grid-forming inverter of claim 15, wherein the phase-compensated harmonic regulator regulates only one of a positive frequency component or a negative frequency component of the voltage harmonics.

\* \* \* \* \*